Nov. 21, 1950  H. A. REINHARDT ET AL  2,530,441

LEATHER SUBSTITUTE

Filed Aug. 3, 1945

INVENTORS
Henry A. Reinhardt
BY Wayne T. Harrison
Rowland V. Patrick
Attorney

UNITED STATES PATENT OFFICE 2,530,441

LEATHER SUBSTITUTE

Henry A. Reinhardt and Wayne T. Harrison, Longmeadow, Mass., assignors to Bigelow-Sanford Carpet Co., Inc., Thompsonville, Conn., a corporation of Massachusetts Application August 3, 1945, Serial No. 608,652

2 Claims. (Cl. 154—46)

Our invention relates to a leather substitute and to methods of producing the same in sheet form. Its object is to provide such a sheet compounded of vinyl plastic and crimped rayon at less cost than leather and having many of the properties of leather in improved degree compared with other leather substitutes.

We have discovered that a sheet composed mainly of certain thermoplastic vinyl resins suitably compounded and reinforced with crimped rayon fibers of certain deniers and lengths possesses even greater durability than leather under the combined abrasion and flexing to which a shoe sole is subjected and also possesses other qualities of leather to a satisfactory degree while having none of the disadvantages of leather substitutes heretofore known to us. We prefer to embody a plasticizer, a stabilizer and a pigment in the sheet.

The sheet may be made in several ways. A preferred method is to combine layers of crimped rayon staple fibers and layers of the plastic material and subject the assembly to heat and pressure as in a press.

Among the many uses to which our sheet material may be put, one of the most important is that of shoe soling and we will therefore describe as an example of our invention a sheet adapted for use as shoe soling and our preferred method of making such a sheet.

In this example of our invention we employ two or more fiber layers. Such a layer is formed by punching or needling crimped rayon staple of approximately 20 denier and preferably between 2 and 6 inches in length into an open weave fabric base, such as woven cotton burlap, jute burlap, cotton tobacco cloth or the like. The fiber layers before being assembled are thoroughly dried to eliminate their normal, or regain, moisture.

The vinyl plastic is a thermoplastic, such as copolymer vinyl chlor acetate, polyvinyl acetate, polyvinyl chloride, copolymer vinyl chloride and vinylidene chloride or polyvinyl butyral. By means of compounding, polyvinyl butyral may also be made thermosetting. Any suitable plasticizer may be used in combination with the above vinyl resins, such as dicarbitol phthalate, dioctyl phthalate, tricresyl phosphate, dibutyl phthalate, etc. I may also use a stabilizer such as sublimed blue lead, calcium stearate, or lead stearate and a pigment, such as carbon black.

A preferred compound is as follows, the parts being by weight:

62 parts copolymer vinyl chlor acetate (Vinylite VYNW)
38 parts dioctyl phthalate
About 5 parts stabilizer and pigments This compound is formed into a plastic film or layer about 0.03 inch thick.

Figure 1:
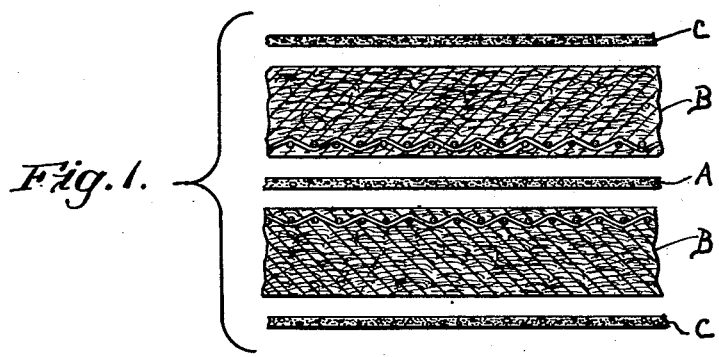
Fig. 1 shows the assembly of the layers of crimped rayon staple and of films or layers of plastic separated from one another.

*Example No. 1.*—Three films of vinyl plastic and two layers of the punched crimped rayon staple fiber are assembled as shown in Fig. 1 for example, namely a middle plastic film A, a fiber layer B on each side, and a plastic film C on the top and on the bottom.

Figure 2:
Fig. 2 shows the consolidated sheet.

An assembly of fiber layers and plastic films is placed in a press of any well known type between metal plates on the top and bottom, where it is heated to a temperature of 300° F. to 350° F. and pressed together in successively increasing pressure stages up to a maximum pressure of 350 to 500 pounds per square inch which is maintained for about fifteen minutes. Under the heat and the pressure the plastic becomes soft and is forced thoroughly into and through the fiber mass so that the crimped rayon and other fiber material become thoroughly imbedded in the plastic material. This bonded combination forms a composite sheet of soling of about 7-iron (.135–.145 inch thick), Fig. 2, which may be cut into shoe soles. The vinylplastic is reinforced by the crimped rayon so that the sheet is tough and has the flexibility necessary for use as shoe soling.

*Example No. 2.*—The film C placed on the top of the assembly may be of double thickness, i. e., about 0.06 inch thick or two films each 0.03 inch thick may be applied. Such assembly is treated in the same way and produces a bonded composite sheet of about 8-iron (0.167–0.172 inch thick).

Figure 3:
Fig. 3 shows the sheet of Fig. 2 with an additional film or layer of plastic on the wear side thereof.

*Example No. 3.*—A sheet of this thickness may be produced by assembling, pressing and heating the five layers of material as in Example No. 1, and then allowing the material in the press to cool, removing the top plate, applying a film D, Fig. 3, 0.03 inch thick on the top of the assembly, applying a metal top plate, which may have an engraved texture finish on its bottom, and pressing the assembly at about 250 pounds per square inch for about ten minutes at a temperature of 300° F. to 350° F. After cooling, the product is removed from the press. This procedure produces an 8-iron soling material.

In such sheets there is by weight about two to three times as much plastic as there is crimped rayon.

We have found that the abrasion resistance, stitch-tear rating, cold temperature flexing properties, flexibility at normal temperatures, waterproofness, mildewproofness and other properties, such as that of being adapted to be cleanly cut and skived, of our material make it a practically satisfactory substitute for leather as soling for shoes and that because of its high abrasion resistance a sole of our material may be used in place of a thicker leather sole.

The following are the results of tests made by an independent testing concern of our soling compared with approved U. S. Quartermaster Corps leather soling:

|  | Our Soling | U. S. Q'Master Soling |
|---|---|---|
| Thickness | 0.172 inch | 0.215 |
| Density | 1.23 inches | 1.02 |
| Abrasive Index (Grams less per 1000 rev.) | 0.076 inch | 0.8–0.9 |
| Stitch tear, lbs.: |  | Minimum required: |
| Dry | per iron 9.4 | per iron 4. |
| Wet (4 hours soak) | per iron 7.3 | per iron 3. |
| Effect of water—increase in thickness. | None | 15–25%. |
| Water absorbed (24 hours soak). | 7% | 68–80%. |

This comparison shows that in abrasive wear our soling is much more durable than that of the U. S. Government leather soling, having an Abrasive Index of 0.076 compared to an Abrasive Index of 0.8 of the leather soling. In stitch tearing our soling is more than twice as strong as the minimum required.

Moreover, our soling, like the best grade of leather, is not affected by cold flexing, whereas the crackiness at cold temperature of soles heretofore made of synthetic material has been a serious defect. Our soling gives better performance than leather under cold and wet conditions because the leather, when wet, freezes and cracks whereas our soling under like conditions does not crack, due principally to the small percentage of water absorbed.

The most common source of failure of shoe soles is due to fatigue under the flexing, rolling and squeezing action in walking. In the standard flexed pressure test a 1½ in. strip of soling is flexed and rolled between two reciprocating cylinders at a pressure of 265 pounds and at a rate of 120 cycles per minute. This test is made both with dry and wet solings. Our solings, both wet and dry, have not failed after 25,000 cycles, which more than meets the requirements of actual service. On the other hand, although dry leather meets this test, wet leather fails under it. We know of no leather leather substitute which, either dry or wet, meets this test.

We have found that the crimped rayon has the properties of stretching within the plastic without slipping or sliding out of position when the material is flexed and of contracting when the material is flattened, so that no bulges occur in the flattened material after flexing. Such bulges would be objectionable as they would be especially subject to abrasion and would thereby cause comparatively rapid deterioration of the material.

Shoe soling is, however, only one of many uses to which our sheet material may be applied in place of leather.

We may, if desired, produce a compound sheet, which is somewhat harder and less flexible than the sheet produced by the preferred formula above given. In such case we use the following:

68 parts copolymer vinyl chloracetate
20 parts dicarbitol phthalate ⎱ plasticizers
12 parts tricresyl phosphate ⎰
2 parts sublimed blue lead (stabilizer)
3 parts carbon black Or, if desired, we may produce a composite sheet which is softer and more flexible, as by the following:

59 parts copolymer vinyl chloracetate
31 parts tricresyl phosphate (plasticizer)
1.5 parts chrome orange (stabilizer)
3.5 parts carbon black The number and thickness of the fiber layers and the number and thickness of the plastic films may be varied to suit different requirements and uses. The fiber layers may be made of felted crimped rayon staple without a fabric base, but we prefer to use such a base because of its added strength. A number of assemblies may be treated in the press at the same time with interposed metal plates. The composition of the wear film may be varied.

The assembly may be consolidated into a composite sheet by any suitable means as, for example, in a continuous process in which a strip of the assembly is passed over a heated drum against which it is pressed.

We have found that crimped rayon staple from 2 to 6 inches long and of substantially circular cross-section and in the range of 10 to 35 denier may be used while about 20 denier is the optimum fiber so that vinyl plastic readily permeates the fibers while maintaining the proper ratio of rayon fibers to the plastic. The crimped rayon fibers of such denier are strongly held in the plastic and serve to bind and hold the elements of the sheet together with the remarkable results above pointed out.

We claim:

1. A sheet material comprising a homogeneous continuous body of a compressed thermoplastic vinyl resin and a plasticizer therefor, a sheet of an open-weave woven cloth embedded within said continuous body of resin, and a mass of individual reinforcing unwoven crimped rayon staple fibers 2–6 inches long and 10 to 35 deniers in diameter extending through the openings thereof and randomly disposed vertically and horizontally and individually embedded in and permeating said continuous body of resin at both sides of the cloth, said resin constituting the major part by weight of said sheet.

2. A sheet material comprising a homogeneous continuous body of a compressed thermoplastic vinyl chloride-vinyl acetate resin and a plasticizer therefor, a sheet of an open-weave woven cloth embedded within said continuous body of resin, and a mass of individual reinforcing unwoven crimped rayon staple fibers 2–6 inches long and 10 to 35 deniers in diameter extending through the openings thereof and randomly disposed vertically and horizontally and individually embedded in and permeating said continuous body of resin at both sides of the cloth, said resin constituting the major part by weight of said sheet, and a pigment distributed through said continuous body of resin.

HENRY A. REINHARDT.
WAYNE T. HARRISON.

REFERENCES CITED

The following references are of record in the file of this patent:

UNITED STATES PATENTS

| Number | Name | Date |
| --- | --- | --- |
| 1,651,535 | McDermott | Dec. 6, 1927 |
| 2,087,441 | Metcalf et al. | July 20, 1937 |
| 2,208,632 | Dreyfus | July 23, 1940 |
| 2,249,745 | Charch et al. | July 22, 1941 |

FOREIGN PATENTS

| Number | Country | Date |
| --- | --- | --- |
| 469,090 | Great Britain | 1937 |